March 28, 1961  J. E. TAYLOR  2,976,677
VARIABLE GEOMETRY DIFFUSER CONTROL FOR JET ENGINES
Filed Oct. 20, 1954

Inventor
JOHN E. TAYLOR by Hill, Sherman, Meroni, Gross & Simpson Attys.

United States Patent Office 2,976,677
Patented Mar. 28, 1961

2,976,677

VARIABLE GEOMETRY DIFFUSER CONTROL FOR JET ENGINES

John E. Taylor, Cleveland, Ohio, assignor to Thompson Ramo Wooldridge Inc., a corporation of Ohio Filed Oct. 20, 1954, Ser. No. 463,531

2 Claims. (Cl. 60—35.6)

The present invention relates to controls for jet engines of airplanes and more particularly is concerned with the provision of a control for the air inlet of engines such as turbojet, turboprop, ramjet, pulsejet and other engines using a high velocity air intake.

With the advent of aircraft capable of traveling above the speed of sound, air flow problems have become increasingly complex. As those skilled in the art are aware, movement of a body through air at a velocity greater than the speed of sound causes the development of shock waves or compression fronts.

The presence of shock waves has an important effect on the operation of such items as jet engines, or any other apparatus deriving its source of air from an air scoop or diffuser opening toward the front of the plane. While it is possible through calculations and experimentation to develop an air inlet for jet engines or the like which is efficient in operation under operating conditions in which the relative velocity of the air entering the inlet is greater than Mach 1, the speed of sound, nevertheless such designs are generally only satisfactory when a characteristic shock wave, for example a normal shock wave, is positioned at a particular design region relative to the inlet. In view of this limitation of design it is necessary, in order to assure efficient operation of the air inlet over wide ranges of aircraft speed and climatic conditions, that a control means be provided for modifying the position of the shock wave when it moves away from the optimum design region and to return it thereto.

The present invention has provided a control device for a jet engine air inlet located either on the nose of the aircraft or downstream thereof which is capable of operation at points well above the speed of sound and has provided the necessary control for accurately positioning a shock wave in the air inlet. This control generally comprises a sensing means positioned adjacent the air inlet and sensitive to variations in air density. The sensing means then relays, through appropriate control circuits, a signal indicating substantially the exact position of the shock wave in the air inlet, to a control motor which in turn operates a central air inlet spike or other apparatus, such as for example a wedge shaped central body, hinged or iris shaped air inlet outer lips, axially movable, telescopically mounted outer lips, side mounted hot bleed openings, etc. to modify the geometry of the air inlet to properly position the shock wave.

The sensing device utilized in the present invention comprises a bar coated with radioactive material extending longitudinal to the air flow and parallel to an electrically conductive channel element. The radioactive material coating the rod causes an ionization of the space between the bar and the channel. This ionization, which is the result of a collision with air molecules of particles such as alpha, beta and gamma particles emitted from the radioactive source, will permit a current flow upon the application of a voltage across the bar and channel members. Since, among other things, the current flow resulting from the applied voltage will depend upon the density of the air between the bar and the channel, the radioactive device may be utilized as a sensing apparatus capable of determining the position of a shock wave when the shock wave lies across the bar and channel elements.

It is therefore an object of the present invention to provide a novel and simple air pressure-sensing apparatus.

Still another object of the present invention is to provide a novel control for the air inlet geometry of an internal combustion engine or the like.

Yet a further object of the present invention is to provide a satisfactory air inlet control for use at relative inlet velocities above Mach 1.

Still a further object of the present invention is to provide a rugged yet simple sensing apparatus for determining the position of a shock wave.

A feature of the present invention is the application of radioactive materials to air pressure-sensing apparatus.

Yet a further object of the present invention is to provide a completely automatic control system for the air inlet opening of an internal combustion engine or the like operating under a relative air inlet velocity greater than Mach 1 and which automatically modifies the geometry of the inlet to vary the position of a shock wave occurring under supersonic conditions, in accordance with a predetermined most efficient design position.

Still other and further objects and features of the present invention will at once become apparent to those skilled in the art from a consideration of the attached sheet of drawings wherein a preferred embodiment of the present invention is shown by way of illustration only and, wherein.

As shown on the drawings.

Figure 1:
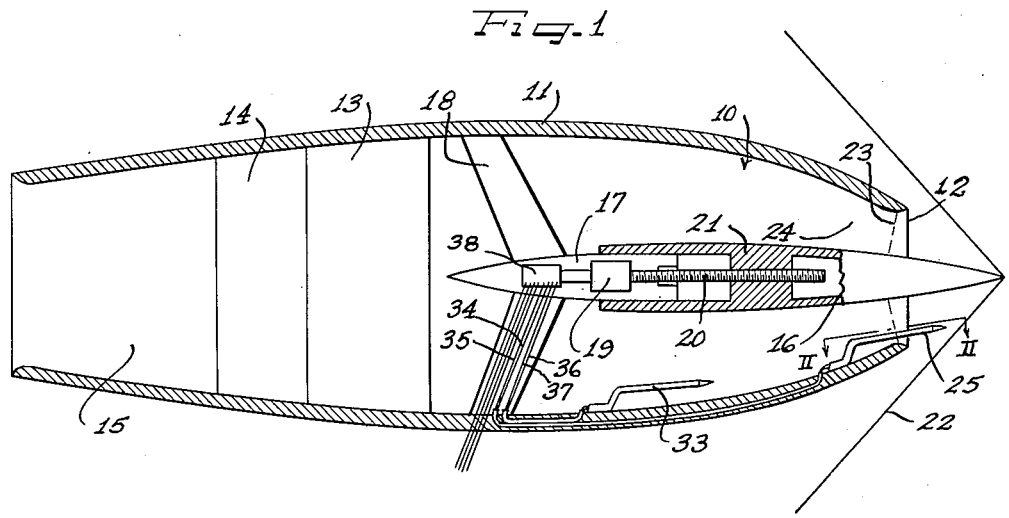
Figure 1 is an elevational view in cross-section of an internal combustion jet type engine incorporating the present invention.

As illustrated in Figure 1, the apparatus of the present invention is shown in combination with a jet type engine generally indicated at 10, having an outer housing shell 11, an air inlet opening 12, a compressor compartment 13, a fuel mixing and igniting section 14 and a burner chamber 15. These elements, thus far discussed, are conventional and it will be understood that the present invention may be utilized with engines or similar devices having substantially any conventional form of power development, as long as the development of such power requires an intake compressible fluid such as atmospheric air.

As mentioned above, the problem of efficient air flow into the forwardly facing air inlet of an internal combustion engine or the like, at relative inlet air velocities above Mach 1, becomes complicated by the compression waves universally associated with such operation. Experiments have shown that the efficiency of an air inlet varies with the position the shock pattern assumes in the inlet or diffuser. Since the positioning of the shock pattern varies with relative inlet air velocity, atmospheric conditions, and back-pressure conditions determined by compressor operation, among other things, it is apparent that where a fixed air inlet is utilized, it can be efficient in providing maximum pressure recovery and minimum additive drag simultaneously only in a very limited number of conditions and situations.

In order to provide a suitably adjustable air inlet, a reciprocably movable control spike 16 is positioned centrally in the inlet 12. The spike 16 is splined to the stationary housing 17 which is in turn rigidly secured to the shell 11 by means of radiating struts 18. The spike 16 may be reciprocated relative to the housing 17 by means of an electrical motor 19 and suitable reduction gearing which drives a worm 20 drivingly associated with a nut 21 fixedly secured to the spike 16. As may be appreciated, reciprocation of the spike 12 will cause the annular inlet 12 to vary in effective size and flow configuration and will also, of course, modify the position of the oblique bow wave 22. Spike adjustment will likewise modify the position of the normal shock 23, moving it axially in the opposite direction of spike movement, as well as the air flow indicated at 24. Of these changes, the adjustment of the position of the normal shock wave 23 is of primary concern since operational efficiency is greatly affected by its position.

The present invention provides a novel means for controlling the position of the spike 16 and hence the exact position of the normal shock 23 under varying atmospheric and flight conditions. In so doing, I have provided a sensing mechanism automatically operable to determine the position of the normal shock by means of the sharp pressure rise across shock wave. The sensing mechanism is connected through a suitable control network to the electric motor 19 to move spike 16 when necessary to reposition the shock wave into its most efficient position subsequent to a deviation therefrom as a result of engine operating conditions.

Figure 2:
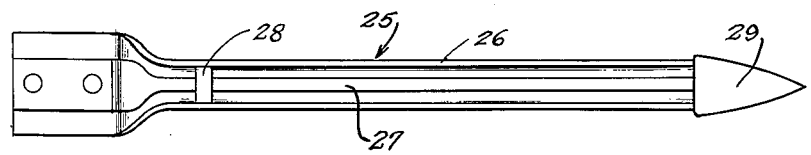
Figure 2 is an enlarged detailed view of the sensing device taken along the line II—II of Figure 1.
Figure 3:
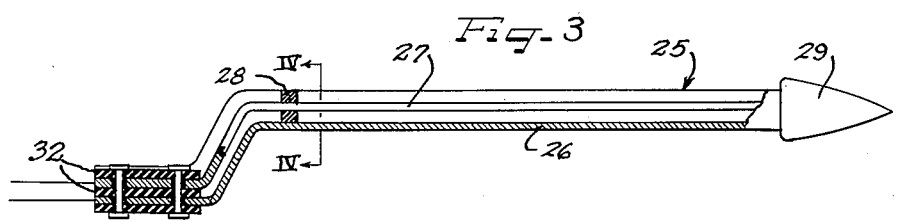
Figure 3 is an elevational view of the sensing device taken along the line III—III of Figure 2.
Figure 4:
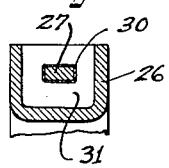
Figure 4 is a cross-sectional view of the sensing apparatus of the present invention taken along the line IV—IV of Figure 3.

The sensing apparatus is more clearly illustrated in Figs. 2, 3 and 4. There, the sensing mechanism, generally indicated at 25 is shown to comprise a longitudinally extending electrically conductive channel member 26 and a longitudinally extending electrically conductive member 27 positioned within the channel and separated therefrom by insulated separators 28, 29 and 32. In order to improve the aerodynamic characteristics of the sensing mechanism, the separator 29 is preferably formed with a sharp nose. This minimizes turbulence which would otherwise have a deleterious effect on the accuracy of the sensing mechanism by causing unstable pressure conditions.

The sensing mechanism 25 operates to control the flow of electricity in a circuit in response to the density of air between the elements 26 and 27. In the apparatus shown in the drawnigs, this is accomplished through coating the elongated member 27 with radioactive material 30 having suitable emission characteristics. For example, the element polonium may be satisfactorily used. This radioactive material emits alpha particles having a very high ionizing power because of their high mass to charge ratio. It will be understood, however, that the present invention is not limited to the use of polonium and that the rapid development of radioisotopes promies to provide a large number of radioactive substances having satisfactory emission characteristics.

Emission of the alpha particles and their impact upon the air in the space 31 between the members 26 and 27 causes an ionization of the space between the members 26 and 27. An application of a voltage across the elements 26 and 27 will cause a current flow across the ionized air space. This current has been found to bear a linear relationship to the average density of the intervening air. Thus, assuming that a normal shock, forming an abrupt change in pressure, crosses the members 26 and 27 at some point intermediate their length, the average density will be determined by the amount of the air space 31 lying upstream of the normal shock and having a low density relative to the amount of air space 31 downstream of the shock position and having a sharply higher density. Since the average value of the density will increase as the shock positions itself further upstream, and likewise will decrease as the shock positions itself downstream relative to the sensing mechanism 25, the mechanism 25 can readily be utilized to sense the exact position of the shock wave.

Since changing of the average density of the air space 31 will also occur as a result of changes in altitude, changes in air speed and changes in air temperature, means must be provided for compensating for these variables. In the present invention a reference transducer, preferably substantially identical to the shock position sensing mechanism 25 is positioned downstream of the air flow in the air inlet chamber in a position entirely within the high pressure zone downstream of the normal shock. Alternatively, the reference transducer may be positioned externally of the shell 11 at a point completely on the upstream side of the normal shock wave 23. Such a reference transducer is subject to all of the variations except the variations imposed by the position of the shock wave itself and by balancing the current flow from the reference transducer against the current flow of the shock wave sensing mechanism when the shock is in its desired position a resultant current reflecting only the variations in density occurring as a result of shock position, will be provided when the shock wave deviates from the desired position.

It is important, also, in the present invention wherein the shock position sensing mechanism utilizes a radioactive material, to provide compensation for disintegration of the radioactive material with time. This is particularly true in cases where the radioactive material has a relatively short half life such as polonium with a half life of 136 days. In order to provide the necessary compensation, the reference transducer is preferably a radioactive one utilizing the same radioactive material.

Such a reference transducer is shown at 33 in the drawings and is positioned well downstream of the normal shock position 23. The connecting conductors 34, 35, 36 and 37 connect the sensing mechanism and the reference transducer to the control box 38 where a conventional bridge circuit is employed to provide a reversing actuation of the motor 19. The circuits employed may, of course, vary over a wide range but preferably comprise a bridge circuit wherein the maximum current flow in one direction is caused when substantially identical pressures are applied to the reference transducer 33 and the sensing mechanism 25. The maximum current flow in the opposite direction, to reverse the electric motor, is achieved when the entire sensing mechanism is upstream of the shock wave and hence at its lowest average air density, with the reference transducer wholly in the high pressure zone thereby providing a maximum pressure difference. The balanced point at which it is desired to place the normal shock preferably produces a balanced no signal output from the bridge. A rheostat or similar adjustment may be provided to balance the current initially or alternatively to control the balancing current manually to move the balanced point, thereby modifying the adjusted position of the shock wave 23 during engine operation.

With the use of a conventional bridge circuit wherein the reference transducer 33 is, along with a resistance adding rheostat, connected as one leg of the bridge in parallel with the sensing mechanism 25, any modification in the resistance offered by the sensing mechanism, as a result of a variation in average pressure between members 26 and 27 which is not simultaneously also found in the reference transducer resistance, will cause an unbalance in the bridge causing energization of the motor 19 to reciprocate the spike 16 to move the position of the shock wave 23 either upstream or downstream as required to place the bridge in balance again.

In operation, the sensing mechanism of the present invention is extremely satisfactory since it does not incorporate any coil windings or similar elements that would disrupt air flow through the jet engine. The coating 30 is, of course, preferably smooth and in view of the streamlined nature of the end insulating element 29, the air flow about the sensing mechanism is essentially streamlined flow. Further, although radioactive materials are at present relatively expensive, nevertheless in the quantities necessary to provide a current sufficient to actuate the usual conventional motor relays, it has been found that less than $25.00 worth of polonium is sufficient to provide satisfactory operation for at least a full half life of the material. In view of the simplicity of operation of the device and the minimum drag characteristics of the device placed in the air stream, the cost is quite nominal.

It will therefore be appreciated that I have provided a simple and yet highly effective pressure sensing and control mechanism capable of sensing the position of a pressure discontinuity and which has an absolute minimum of physical effect on the air flowing past the sensing device. Further, the sensing device is capable of simple manufacture and is usable with conventional current amplifiers to provide a control signal suitable for the actuation of motor control relays of a conventional nature. In this last connection it is to be noted that while the motor 19 has been indicated to be an electric motor, it is apparent that hydraulic or pneumatic motor could be used equally as well, under the control of an electrically actuated valve controlling the source of motive power.

It will be understood that modification and variations may be made in the structure above described without departing from the scope of the novel concepts of the present invention. For example, it will be noted that the specific cross-section of the channel member 26 may be modified to assume an arcuate form, or, in some cases, it may take the form of a rod substantially the same as the rod 27, and extending parallel to the rod 27. Since such changes are considered within the scope of the present invention, it is my intention that the invention be limited only by the scope of the appended claims.

I claim as my invention:

1. Apparatus for sensing the position of an abrupt pressure change taking the form of a shock wave formed at the transition point of air slowing from a supersonic to a subsonic velocity while moving along a predetermined longitudinally etxending path, comprising a longitudinally extending member, a second member substantially parallel to said first member in close proximity thereto, air streamlining cone means secured at the upstream ends of said first and second members for smoothly deflecting the air flow around said members, the space between said members permitting free transverse circulation between the members while said streamlining cone prevents substantial longitudinal movement of air between said members whereby the air between said members reflects the average air pressure along the longitudinal length of said members without relation to its velocity, first means applying a voltage across said members and second means associated with said members for modifying the flow of current between said members in direct relation to the average density of the air between said members, said second means comprising an alpha particle emitting substance extending along the length of one of said members for ionizing the space between said members.

2. Apparatus for sensing the position of an abrupt pressure change taking the form of a shock wave formed at the transition point of air slowing from a supersonic to a subsonic velocity while moving along a predetermined longitudinally extending path, comprising a longitudinally extending member, a second member substantially parallel to said first member in close proximity thereto, air streamlining cone means secured at the upstream ends of said first and second members for smoothly deflecting the air flow around said members, the space between said members permitting free transverse circulation between the members while said streamlining cone prevents substantial longitudinal movement of air between said members whereby the air between said members reflects the average air pressure along the longitudinal length of said members without relation to its velocity, first means applying a voltage across said members and second means associated with said members for modifying the flow of current between said members in direct relation to the average density of the air between said members, said second means comprising a radioactive coating on one of said members in position thereon facing the other of said members and extending longitudinally the full length thereof for ionizing the air in the space between said first and second members.

References Cited in the file of this patent

UNITED STATES PATENTS

| | | |
|---|---|---|
| 2,462,351 | Blau et al. | Feb. 2, 1949 |
| 2,497,213 | Downing | Feb. 14, 1950 |
| 2,637,208 | Mellen | May 5, 1953 |
| 2,638,738 | Salter | May 19, 1953 |
| 2,653,295 | Carlson | Sept. 22, 1953 |
| 2,627,543 | Obermaier | Feb. 3, 1953 |